United States Patent
Beier et al.

(10) Patent No.: US 10,944,944 B2
(45) Date of Patent: Mar. 9, 2021

(54) AUTOMATICALLY PRODUCING AN OPTICAL BLEND MASK INDIVIDUALLY ADAPTED TO A PROJECTOR AND ITS POSITION TO A PROJECTION SURFACE OF THE PROJECTION SYSTEM

(71) Applicant: Domeprojection.com GmbH, Berlin (DE)

(72) Inventors: Daniel Beier, Magdeburg (DE); Danilo Gulamhussene, Magdeburg (DE); Christoph Bode, Magdeburg (DE); Gino Gulamhussene, Magdeburg (DE); Christian Steinmann, Magdeburg (DE)

(73) Assignee: Domeprojection.com GmbH, Berlin (DE)

( * ) Notice: Subject to any disclaimer, the term of this patent is extended or adjusted under 35 U.S.C. 154(b) by 0 days.

(21) Appl. No.: 16/462,369

(22) PCT Filed: Nov. 17, 2017

(86) PCT No.: PCT/DE2017/000389
§ 371 (c)(1),
(2) Date: May 20, 2019

(87) PCT Pub. No.: WO2018/095449
PCT Pub. Date: May 31, 2018

(65) Prior Publication Data
US 2019/0342530 A1    Nov. 7, 2019

(30) Foreign Application Priority Data
Nov. 23, 2016  (DE) .................... 10 2016 013 994.3

(51) Int. Cl.
*H04N 9/31* (2006.01)
*G03B 21/13* (2006.01)
*G03B 21/26* (2006.01)

(52) U.S. Cl.
CPC ........... *H04N 9/3147* (2013.01); *G03B 21/13* (2013.01); *G03B 21/26* (2013.01)

(58) Field of Classification Search
CPC .. H04N 9/3147; H04N 9/3179; H04N 9/3182; H04N 9/3185; H04N 9/3188; G03B 21/13
See application file for complete search history.

(56) References Cited

U.S. PATENT DOCUMENTS 6,017,123 A * 1/2000 Bleha ................... H04N 5/7416
                                              348/E5.139
6,310,650 B1 * 10/2001 Johnson ................... H04N 9/12
                                                  348/189

(Continued)

FOREIGN PATENT DOCUMENTS

EP    1422939 A2    5/2004
EP    1613071 A1    1/2006

(Continued)

OTHER PUBLICATIONS

International Search Report of PCT/DE2017/000398, dated Mar. 3, 2018.

*Primary Examiner* — Bao-Luan Q Le
(74) *Attorney, Agent, or Firm* — Cohen & Hildebrand, PLLC

(57) ABSTRACT

A method for automatically producing an optical blend mask arranged in a beam path (8) of a projector (2) in a projection system with two projectors (2), by determining an actual state of the projection system by calibrating and producing an ideal blending, ascertaining an individual distortion of the projector (2) by using a front or back projection surface (11), introduced into the beam path (8), using patterns (13) from which points are derived, ascertaining the alignment and the position of the front or back projection surface (11) within a blend mask plane, calculating the optical blending for a partial image, for positioning and/or a transformation of the (Continued)

ideal blending, adapting the ideal blending for compensating a soft focus, applying the ascertained, individual distortion of the projector (2) to the blending, ascertaining data of the optical blend mask and outputting data for producing the optical blend mask.

8 Claims, 7 Drawing Sheets

(56) References Cited

U.S. PATENT DOCUMENTS

| | | | | |
|---|---|---|---|---|
| 6,513,938 B2* | 2/2003 | Kubota | ............ | G03B 21/10 348/E5.144 |
| 6,525,772 B2* | 2/2003 | Johnson | ............ | H04N 9/12 348/189 |
| 6,558,006 B2* | 5/2003 | Ioka | ............ | G03B 21/13 348/E9.027 |
| 6,570,623 B1* | 5/2003 | Li | ............ | H04N 9/12 348/383 |
| 6,590,621 B1* | 7/2003 | Creek | ............ | H04N 9/12 348/E5.141 |
| 6,637,887 B2* | 10/2003 | Yamanaka | ............ | G03B 21/26 348/744 |
| 6,727,864 B1* | 4/2004 | Johnson | ............ | G03B 21/13 345/1.3 |
| 6,781,563 B2* | 8/2004 | Nishio | ............ | G03B 21/13 345/1.1 |
| 6,814,448 B2* | 11/2004 | Ioka | ............ | G03B 21/005 348/745 |
| 7,270,426 B2* | 9/2007 | Miyazawa | ............ | G03B 21/13 353/30 |
| 7,278,746 B2* | 10/2007 | Matthys | ............ | G03B 21/13 353/94 |
| 7,339,625 B2* | 3/2008 | Matthys | ............ | G03B 21/13 348/383 |
| 7,364,310 B2* | 4/2008 | Yamazaki | ............ | G03B 21/13 348/E5.144 |
| 7,651,226 B2* | 1/2010 | Schultz | ............ | G03B 21/14 345/1.3 |
| 7,703,929 B2* | 4/2010 | Yamada | ............ | H04N 9/3147 353/30 |
| 8,251,512 B2* | 8/2012 | Adkins | ............ | H04N 9/3147 348/746 |
| 8,777,418 B2* | 7/2014 | Wright | ............ | G03B 21/14 353/121 |
| 10,205,920 B2* | 2/2019 | Shimizu | ............ | G03B 21/206 |
| 2001/0022651 A1* | 9/2001 | Kubota | ............ | G03B 21/10 353/94 |
| 2001/0026247 A1* | 10/2001 | Nishio | ............ | G03B 21/13 345/4 |
| 2002/0024640 A1* | 2/2002 | Ioka | ............ | H04N 9/3147 353/94 |
| 2002/0027608 A1* | 3/2002 | Johnson | ............ | H04N 9/3147 348/383 |
| 2002/0041364 A1* | 4/2002 | Ioka | ............ | G03B 21/005 353/69 |
| 2002/0054275 A1* | 5/2002 | Yamanaka | ............ | G03B 21/26 353/30 |
| 2003/0227599 A1* | 12/2003 | Weissman | ............ | H04N 9/3147 353/94 |
| 2005/0083492 A1* | 4/2005 | Taubenberger | ............ | H04N 9/3147 353/94 |
| 2005/0179874 A1* | 8/2005 | Miyazawa | ............ | G03B 37/04 353/94 |
| 2005/0287449 A1* | 12/2005 | Matthys | ............ | G03B 21/13 430/30 |
| 2006/0227301 A1* | 10/2006 | Matthys | ............ | G03B 21/13 353/94 |
| 2007/0024826 A1 | 2/2007 | Gilbert | | |
| 2007/0171380 A1* | 7/2007 | Wright | ............ | H04N 5/74 353/69 |
| 2008/0143969 A1* | 6/2008 | Aufranc | ............ | G03B 21/26 353/30 |
| 2008/0259223 A1* | 10/2008 | Read | ............ | H04N 9/3147 348/745 |
| 2011/0242494 A1* | 10/2011 | Imai | ............ | H04N 9/3147 353/30 |
| 2014/0354957 A1 | 12/2014 | Vermeirsch | | |
| 2016/0073070 A1 | 3/2016 | Spear | | |
| 2018/0098021 A1* | 4/2018 | Shimizu | ............ | H04N 9/3155 |

FOREIGN PATENT DOCUMENTS

| | | |
|---|---|---|
| GB | 2508429 A | 6/2019 |
| WO | 2012076706 A1 | 6/2019 |

* cited by examiner

AUTOMATICALLY PRODUCING AN OPTICAL BLEND MASK INDIVIDUALLY ADAPTED TO A PROJECTOR AND ITS POSITION TO A PROJECTION SURFACE OF THE PROJECTION SYSTEM

This is an application filed under 35 USC § 371 of PCT/DE2017/000389, filed on Nov. 17, 2017, claiming priority to DE 10 2016 013 994.3 filed on Nov. 23, 2016, each of which is herein incorporated by reference in its entirety.

BACKGROUND OF THE INVENTION

(1) Field of the Invention

The invention relates to a method for automatically producing an optical blend mask which is used in the beam path of a projector in a projection system comprising at least two projectors.

(2) Description of Related Art

Large-area projections, which are produced by so-called projection systems, are usually composed of several small projections or partial images, with the individual projection channels which produce the partial images being geometrically distorted and blended in a manner adapted to the projection surface. In this way, a correspondingly large-scale homogeneous projection or display on the projection surface can be produced, for example, by using four projectors, which each produce a partial image of the large-area projection.

The information required for the distortion and blending are determined, for example, by a so-called calibration of the overall projection or the projection system. For this purpose, predefined patterns are projected onto the projection surface. These patterns mark points on the projection surface or are designed so that points can be derived therefrom. Points derived in this way can be obtained from two intersecting lines or, for example, from one corner of a flat geometric figure.

The spatial positions (X, Y and Z coordinates) of these marked points are measured, for example, with two cameras. Based on this point model, the overlap of the individual projectors can be determined at any point on the projection screen and a blending for each projector involved in the production of the large-area projection can be derived therefrom. This blending is realized by the optical blend mask to be produced automatically.

According to the prior art, the video signals of the individual video channels of the projectors, which are required for each partial image generation, are varied after image formation by using suitable methods for distortion and blending of the video signals. Subsequently, the thus-changed signal is supplied to a projector as an input signal, which produces the corresponding partial image on the projection surface. This process of signal processing or signal change is usually performed for each of the video channels involved in generating the projection, that is, for each partial image.

Thus, the changes of the video signals necessary for generating the large-area projection on a projection surface, for example, to adapt to the given projection surface and/or to a blending, are directly applied to the input signal of each projector and affect the projection of the displayed partial images.

Alternatively, it is known that blending can be realized by using optical blend masks, which are arranged in the beam path in front of the respective projector.

Regardless of the selected method for the distortion and/or the blending, a recalibration of the projection system is required in the event that one or more projections or projection channels change, for example, due to a change in the position of one or more projectors. The distortion and the blending must also be corrected with the new data of the calibration. In addition to a change in position, a recalibration and adjustment of the projection system is usually required even when replacing a lamp in a projector.

Most projectors are in principle unable to project images or partial images that are displayed in an image part having no brightness, i.e. which are completely black. This is due to the fact that the light source in the projector is always on and that the light path cannot be completely blocked. As a result, projectors have a so-called residual brightness, for example when displaying a black screen.

Large-area projections using multiple projectors are usually generated by at least partially overlapping the partial images in their peripheral areas, thereby producing a so-called blend zone. When such image areas overlap in the blend zone, the residual brightness of the different projectors is unfavorably superimposed. In particular, when representing very dark image areas in the overlaps of the partial images, the resulting residual brightness is perceived by a viewer as very disturbing, since the blending has no effect on the residual light.

One solution to the problem of this residual brightness is to reduce or prevent the residual light projection by using an optical blend mask in the light path. When using, for example, four projectors in a large-area projection, four optical blend masks must be provided, i.e. one blend mask for each projector.

In the prior art, these optical blend masks are produced strictly according to a design or according to data from corresponding test projections. Since the real projection system is always different from the design or from an ideally planned projection, the results produced with these optical blend masks are not always satisfactory.

The reason for the limited functionality of such optical blend masks is, on the one hand, based on the fact that it is very difficult in practice to construct a projection system exactly according to a given design. On the other hand, a so-called individual distortion of a projector caused by inaccuracies in the manufacture of the lenses or lens pairs of a projector cannot be taken into account at all or only with a substantial design effort.

EP 1 422 939 A2 discloses a multi-channel projection system and a method for realizing large projection surfaces. To provide a low-cost, large-area projection, a multi-channel projection system with at least two side-by-side or stacked projectors is proposed, with a single projector each projecting part of the image. The described projection system is characterized in that an identical input signal representing the projected total image is applied to the at least two projectors, wherein the pixel resolution of the image to be displayed is greater than the resolution of the projection screens of the at least two projectors and means are included for electronically moving the image on the respective panel of the projectors, such that the partial images projected by the individual projectors together produce the total image to be projected.

WO 2012/076706 A1 discloses an optical blend mask suitable for use in representing an overall picture composed of several overlapping individual images. The mask includes an arrangement of elongated sliding elements disposed side-by-side on a carrier, with each sliding element being disposed for moving independent of one another along an axis. It is intended to arrange one or more of these masks, for example, in a light beam of a projector and to thus change the transmission of the light.

U.S. Pat. No. 6,513,938 B2 relates to a projection system with a plurality of image projection means, in which overlapping partial images projected by the plurality of image projection means are arranged in such a way that an overall image is produced. The object of this document can be seen to provide a projection system, which makes it possible to provide an overall picture composed of a plurality of partial images with a virtually uniform luminance level over the entire projection area.

The arrangement includes a plurality of image projection means having one or more intercepting plates arranged between the image projection means and the projection surface, a luminance detection means, a displacement calculating means and a control means.

It is disclosed, for example, to use an L-shaped intercepting plate in front of one of four image projection means, which arranged in front of the image projection means for displacement in order to adjust the required luminance. It is also intended to automate this displacement by using a control signal produced by the control means and corresponding drive means which are adapted to change the position of the intercepting plate in front of the image projection means in the vertical and horizontal directions.

EP 1 613 071 A1 disclose a method for providing attenuation of the luminous intensity of an image in an edge region of one of a plurality of tiled partial images in a total projection displayed by a projection display system. In particular, the document relates to a method for obtaining improved blending of tiled images displayed by a projection display system. The method provides both good black-level blending and high flexibility.

A first light intensity is changed with an electronic soft-edge device over a first fraction of the edge region from a first intensity value to a first fraction of the first intensity value and a gradual change of the first light intensity by an optical soft-edge device over a second fraction of the edge region from a second fraction of the first intensity value to a third fraction of the first intensity value. The optical attenuation of the light intensity of the image should here be substantially constant in the first fraction and in the second fraction of the edge region. The optical soft-edge device includes at least one mask.

In a particular embodiment, a third fraction is also provided which is arranged between the first and the second fraction and in which both the electronic soft-edge device and the optical soft-edge device are used for influencing the light intensity of the third fraction.

The prior art thus has the disadvantages that no optimal compensation for the problem associated with residual brightness occurring in the blend zones of a large-area projection is provided. In particular, compensation by using an optical blend mask cannot be adapted automatically to the real projection system, which always differs at least partially from a planned design, and/or to existing distortions of the projectors, which likewise always occur in practice. Alternatively, it is only possible to manually adjust the optical blend masks and the blending. For this purpose, elements that influence the propagation of the light can be introduced into the beam path, for example in the region of the blend masks. Such an adjustment of the mask is a manual adjustment operation, which requires an experienced professional and is subject to subjective evaluation.

BRIEF SUMMARY OF THE INVENTION

The object of the invention is to provide a method for producing an optical blend mask, with which an optical blend mask is produced automatically, which is adapted to an actual individual state of a projection system as well as to distortions caused by at least one lens of a projector.

The object is achieved by a method having the features according to claim 1. Further developments are specified in the dependent claims 2 to 8.

According to the present invention, it is provided that one or more optical blend masks are calculated and produced based on data determined during calibration of an actual state of a projection system. Each optical blend mask produced in this manner is after its production arranged or mounted at a defined location in the beam path of an associated projector.

The uniqueness of the method according to the invention is that blending is calculated with the aid of projected points located within patterns whose spatial position is measured and which are projected onto the projection surface and hence also imaged on the projection surface located in the plane of the blend mask, and this calculated blending is transmitted or printed onto an optical blend mask located in the beam path of the projector. For this purpose, the position of a frame receiving the optical blend mask to be produced or of the frame with a front or rear projection surface is measured in the beam path. To realize this measurement, the frame and/or the front or rear projection surface is provided with so-called measuring marks. The position of the blend mask and the blend characteristic on the automatically produced mask can be calculated therefrom.

Optical blend masks produced in this way significantly reduce or eliminate the disadvantage of optical blend masks calculated and fabricated according to a given design and do not require a manual setup.

This is true both for the inaccuracy of the optical blend mask, which results from the fact that it is practically very difficult to construct the projection system exactly as designed, as well as for the proportion of the inaccuracy caused, for example, by an individual distortion of each projector-lens pair.

Either inaccuracies or disturbances are taken into account in a design of the optical blend mask based on data produced by the calibration, i.e. by a measurement of the real actual state of the projection system. In this way, an optical blend mask is produced, which is individually adapted to the associated projector and its position with respect to the projection surface or the projection system.

To produce the data necessary for the production of the optical blend masks, the following process steps explained below are carried out:

In the first method step, the blending is calculated for each individual projection based on a measurement of the overall projection. The blending is calculated in relation to the image signal. In a subsequent method step, the distortions of all the projector-lens pairs are measured in a so-called blend mask plane, which is located in a plane, typically orthogonal to the optical axis, immediately in front of the respective projector-lens pair. This makes it possible to determine at which location and with which distortion the calculated blending must be placed as an optical blend mask.

For this measurement of the distortion, a front or rear projection surface is arranged in front of each projector at a location in the beam path of the projector (blend mask plane) where the optical blend mask to be produced is used after its production.

Several optical markers are located on this front or rear projection surface. The front or rear projection surface is respectively received by a holder or frame, which is arranged in front of the respective projector. The front or rear projection surface is removable from the holder and can always be brought exactly in the same position by the holder which is firmly connected to the projector or to another fixed point. After completion of the optical blend mask, the optical blend mask is inserted in the holder or frame at the location of the front or rear projection surface.

The markers on the frame form a local reference coordinate system. The distortion of the projector is determined in this coordinate system with a calibration. At the same time, the position of the optical blend mask within the local reference coordinate system is determined.

To perform the calibration, patterns from which points can be derived are projected onto the front or rear projection surface arranged in the blend mask plane, which are recorded with a camera and provide an association of the front or rear projection surface with the local reference coordinate system.

At least one such camera can be arranged, for example, in front of or behind the blend mask plane and aligned with the front mask or rear projection surface arranged in the blend mask plane.

The data of an optical blend mask calculated with the method are transferred by a suitable technique to a transparent support medium, which may be for example a foil or glass.

In an alternative embodiment, the data obtained in the method may be used, for example, to control a display arranged in front of the projector at the location of the optical blend mask. For this purpose, any display transmitting the light from the projector can be used. As with a manufactured optical blend mask, the data define a brightness value of pixels in the display, with a reduction in the brightness value resulting in an attenuation of the transmitted light at that location. Such a display can, for example, be a so-called Digital Information Display (DID), a transparent Liquid Crystal Display (LCD), or a transparent Organic Light Emitting Diode Display (OLED).

The produced optical blend masks contain registration marks which correspond exactly to the markers of the frames. The optical blend masks can thus be fixed in the frame very precisely and thus assume an exact position in the reference coordinate system.

The optical blend masks are pushed into holders located at a fixed position in front of the projector. By using this transitive, relative position specification, the mask is positioned exactly in the projection path, i.e. in the beam path of the respective projector in front of this associated projector.

Process Flow:
1. Measuring the projection system and generating the ideal blending
2. Arranging a front or rear projection surface in frames in front of a projector:
   a) Projecting patterns from which points can be derived,
   b) Recording the points derived from the pattern, for example by using a camera,
   c) Determining the position of the recorded points in the local reference coordinate system,
   d) Association with the projected points,
   e) Calculating the distortion of the projector.
3. Calculation of the optical blending:
   a) Positioning and/or transforming the ideal blending onto the blend mask layer,
   b) Filtering or adapting the ideal blending to compensate for the soft focus in the light path, since the optical blend mask in the blend mask plane is not in the focal plane of the projector,
   c) Optional iterative optimization of the optical blend mask produced according to steps a) and b), wherein the ideal image of the blending on the projection surface (blend result) is simulated and compared with blending expected using the previously created optical blend mask in order to reduce the deviations between the ideal image of the blending and the expected blending,
   d) Application of the distortion of the projector as determined in point 2 to the blending.
4. Outputting the generated data for producing the optical blend mask.

In this case, ideal blending is to be understood as blending which would allow an absolutely error-free projection of a partial image. The method automatically determines data that can be used to produce an optical blend mask, which very closely approximates the characteristics of the ideal blending.

The iterative optimization in point 3c is necessary to reduce disturbances in the representation of the large-area projection 5, which are caused by diffraction effects and/or distributed light sources.

BRIEF DESCRIPTION OF THE DRAWINGS

Further details, features and advantages of embodiments of the invention will become apparent from the following description of exemplary embodiments with reference to the accompanying drawings, which show in.

DETAILED DESCRIPTION OF THE INVENTION

Figure 1:
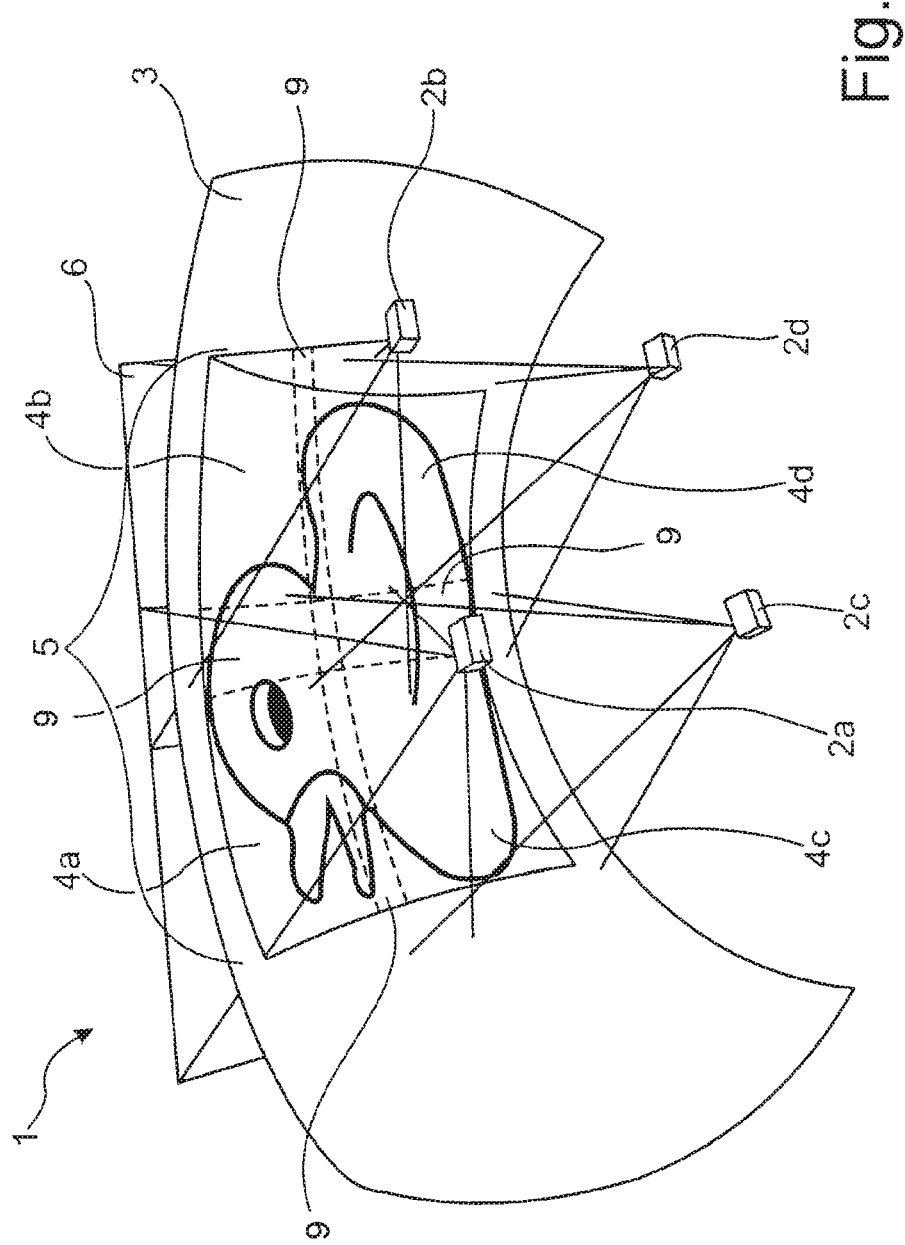
FIG. 1 a schematic diagram of a large-scale projection onto a curved projection surface with several projectors, FIG. 2 a diagram of the partial images of the large-area projection, FIG. 3 a diagram of possible signal processing steps for generating of partial images of a large-scale projection, FIG. 4 a large-area projection by using two projectors with a blend zone located between the produced partial images, FIG. 5 a diagram of four optical blend mask masks, which are used in generating a large-area projection using four projectors, FIG. 6 one of several projectors for producing a large area projection with an optical blend mask arranged in the beam path of the projector, and FIG. 7 the positioning of a front or rear projection surface in a frame in the beam path of a projector in front of a projection surface.

FIG. 1 shows a projection system 1, which by way of example includes four projectors 2a, 2b, 2c, 2d. Each projector 2a, 2b, 2c, 2d produces a partial image 4a, 4b, 4c, 4d on the projection surface 3, which together produce a large-area projection 5. The generation of this large-area projection 5 takes place in such a way that a blend zone 9 is formed between two adjacent partial images 4a, 4b, 4c, 4d, in which image portions of the adjacent partial images 4a, 4b, 4c, 4d are superimposed. The image signals or video signals of the partial images 4a, 4b, 4c, 4d required for the control of the projectors 2a, 2b, 2c, 2d are generated in a suitable central signal generating unit, which will not be described in detail, since it does not affect the disclosure of the present invention.

The required partial images 4a, 4b, 4c, 4d are initially generated in the signal generation unit in such a way that the large-area projection 5 can be projected without errors when displayed only on a flat projection surface 6, which is shown in FIG. 1 solely for simplifying the illustration.

To enable an error-free representation on the curved projection surface 3, the entire projection system 1 is calibrated. In this calibration, data is produced which makes it possible to distort the partial images 4a, 4b, 4c, 4d in such a way that they are displayed to a viewer on the curved projection surface 3 and perceived by the viewer to be true to the original, without undesired displacements or distortions.

In addition to this distortion of the partial images 4a, 4b, 4c, 4d, the signals of the partial images 4a, 4b, 4c, 4d are also changed for superposition in the blend zones 9 with sufficient accuracy and are hence can no longer perceived by the viewer as individual or separate partial images 4a, 4b, 4c, 4d, thus visually displaying a coherent large-area projection 5. For this purpose, blending, i.e. an adjustment of the brightness of the partial images 4a, 4b, 4c, 4d within the blend zones 9, must be performed.

Figure 2:
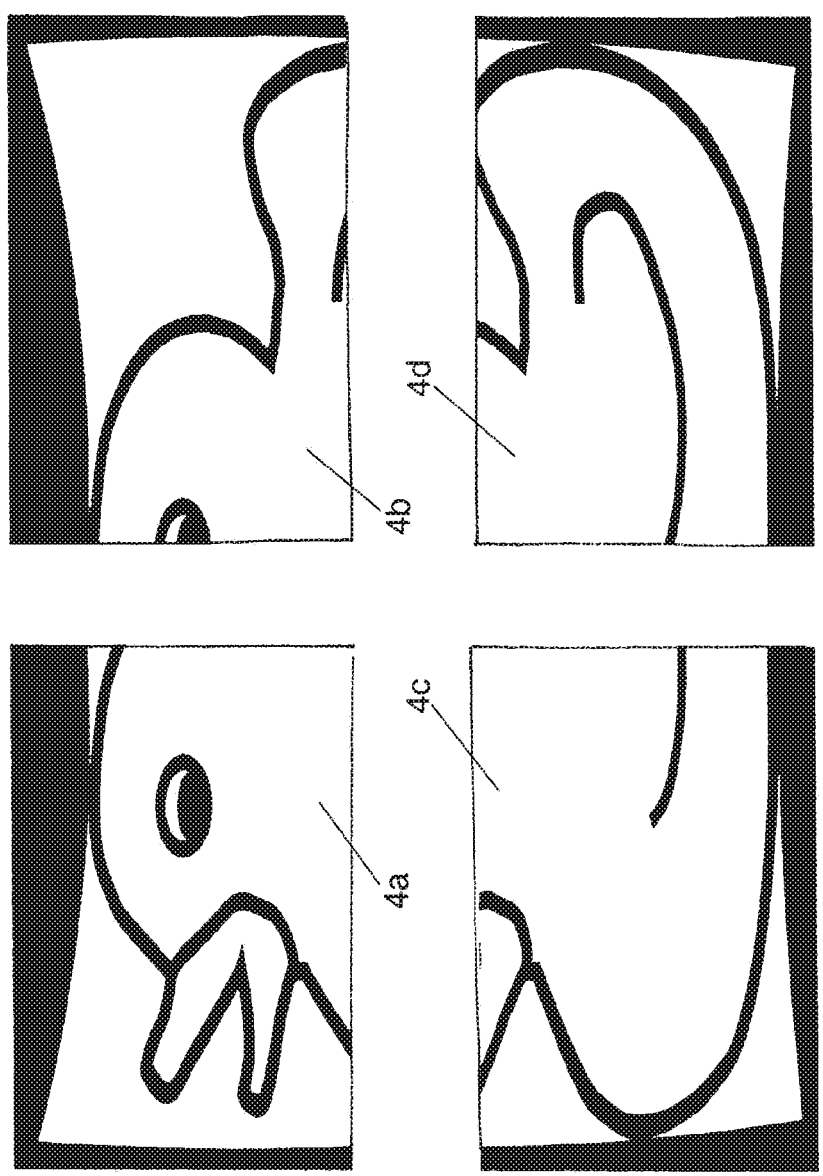

FIG. 2 shows the partial images 4a, 4b, 4c, 4d of the large-area projection 5 in respective individual images. As can be clearly seen, for example, in the partial images 2a and 2b, the partial images 2a and 2b can produce a fault-free image only when they partially overlap along their common side. It can also be clearly seen in the example of the partial images 4a and 4b that the eye of the illustrated duck must be brought into agreement in order to obtain an error-free large-area projection 5.

Figure 3:
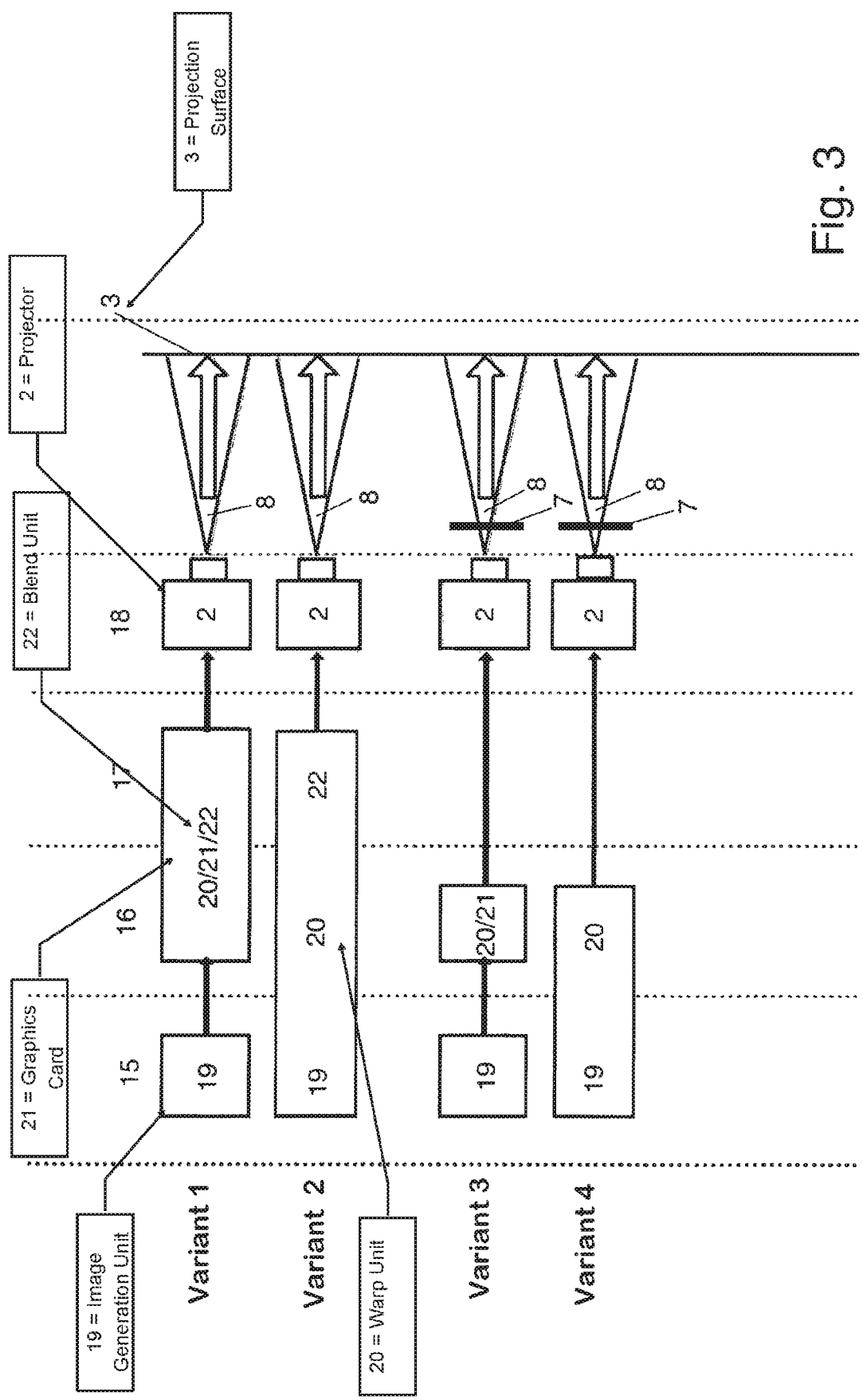

FIG. 3 shows various process flows for distorting and blending the partial images 4a, 4b, 4c, 4d. The illustration shows the sections Image Generation 15, Distortion 16, Blending 17, Projection 18 and the respective light path 8.

In the first variant (variant 1), after the image or video signals to be displayed are generated in an image generation unit 19, for example in a computer, the partial images 4a, 4b, 4c, 4d in the section 16 are distorted for adaptation to the conditions of an uneven projection surface 3. This adaptation takes place, for example, in a special distortion unit (warp unit) 20 or in a graphics card 21. Subsequently, a blending method is used in section 17 before the adapted signals of the partial images 4a, 4b, 4c, 4d in section 18 are each projected on the projection surface 3 with respective projectors 2a, 2b, 2c, 2d via the light paths 8. The blending can be realized in a special blend unit 22 as well as with a graphics card 21.

In the second variant (variant 2), the image or video signals to be displayed are already generated by taking into account the distortion as well as the blending in a single step in a suitable unit, such as a computer. This unit or this computer represents the image generation unit 19, the distortion unit (warp unit) 20 and the blend unit 22 and applies the distortion of the signal to be performed in section 16 and the blending to be performed in section 17. The thus generated signal of a partial image 4a, 4b, 4c, 4d is again projected in section 18 onto the projection surface by using a projector 2a, 2b, 2c, 2d via the light path 8.

In the third variant (variant 3), the image or video signals to be displayed are generated in an image generation unit 19, such as a computer or similar unit suitable for data processing. The signal produced in this way is supplied to a distortion unit (warp unit) 20 or a graphics card where the signal experiences in section 16 a corresponding distortion for adaptation to the projection surface 3. This distorted signal is projected in section 18 by using a projector 2a, 2b, 2c, 2d via the light path 8 onto the projection surface 3, wherein each projector 2a, 2b, 2c, 2d has an optical aperture mask 7a, 7b, 7c, 7d arranged in the beam path 8 immediately in front of a projector 2a, 2b, 2c, 2d, which realizes the blending of the signal.

In the fourth variant (variant 4), the image or video signals to be displayed are produced by an image generation unit 19, for example in a computer, in which the signal also experiences a corresponding distortion. The computer thus also represents the operation of the distortion unit (warp unit) 20. In this variant, too, the distorted signal is subsequently projected in section 18 onto the projection surface 3 by using a respective projector 2a, 2b, 2c, 2d via the light path 8, with an optical blend mask 7a, 7b, 7c, 7d, which implements blending of the signal, arranged in the beam path 8 immediately in front of each projector 2a, 2b, 2c, 2d.

Figure 4:
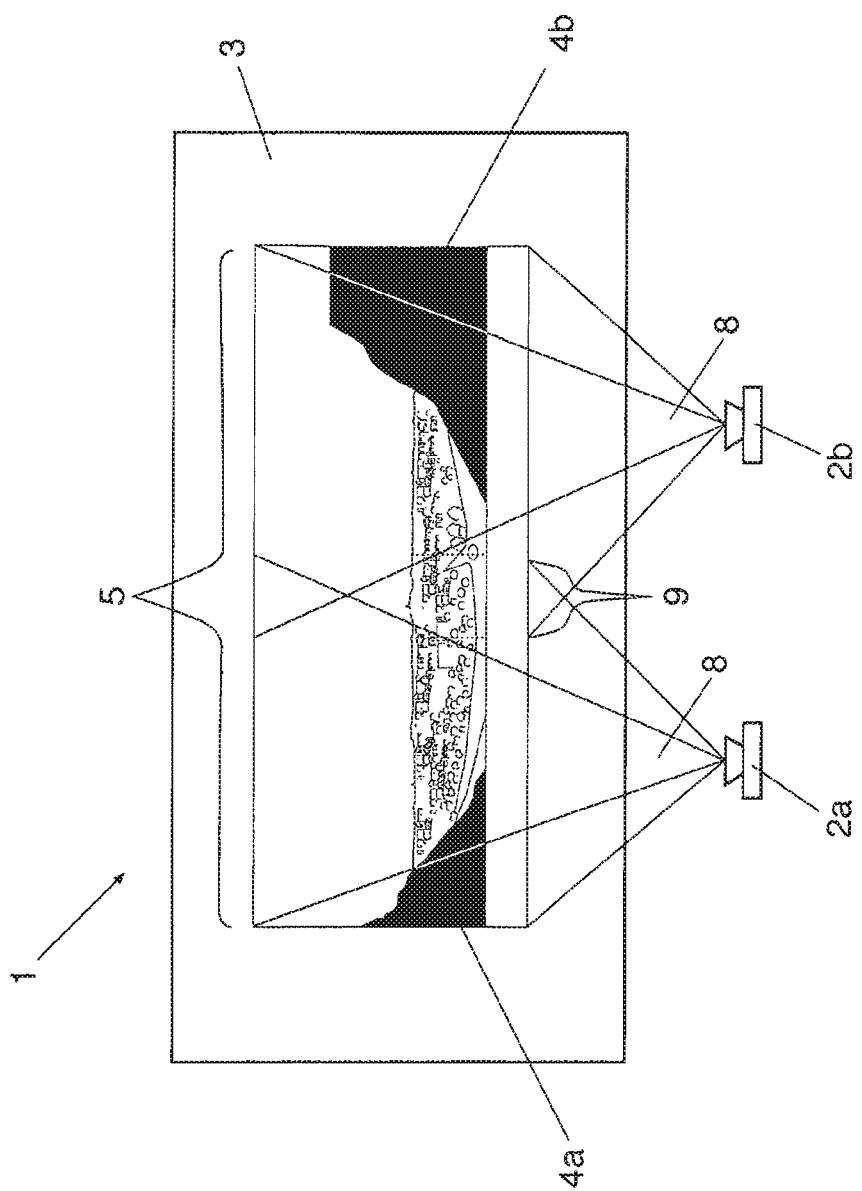

FIG. 4 shows a large-area projection 5 using two projectors 2a and 2b. The partial images 4a and 4b produced by the projectors 2a and 2b are projected onto the projection surface 3, creating between the partial images 4a and 4b a blend zone 9, in which the partial images 4a and 4b overlap. As shown in FIG. 4, not only the image contents of the partial images 4a and 4b overlap in the blend zone 9, but also the respective brightness of the partial images 4a and 4b. As already described, this overlap of the respective brightness must be compensated by the blending so that the overlap can no longer be perceived by the viewer as disturbing.

For this purpose, suitable methods are used for blending, i.e. for influencing the brightness of the image or video signals of the partial images 4a and 4b in a suitable unit such as a computer or a graphics card. Alternatively, an optical blend mask 7a and 7b can be used in the beam paths 8 of the respective projectors 2a and 2b. Such optical blend masks 7a and 7b are not shown in FIG. 4.

Figure 5:
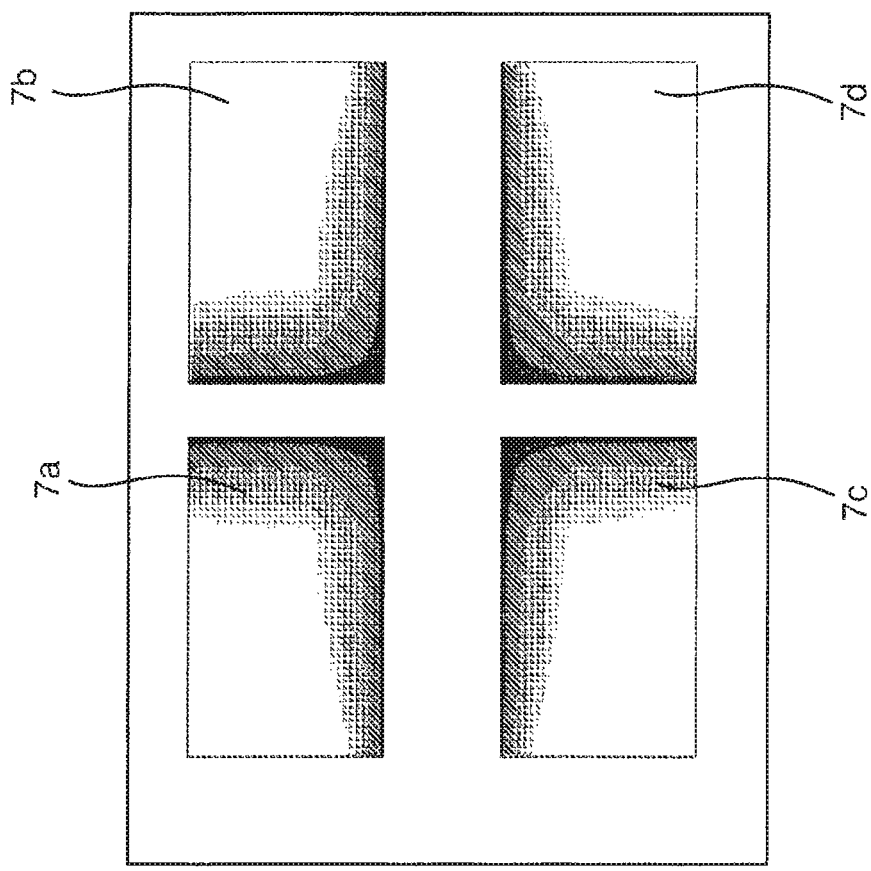

FIG. 5 shows four exemplary optical blend masks 7a, 7b, 7c, 7d. These four optical blend masks 7a, 7b, 7c, 7d are intended for a projection system that produces a large-area projection 5 composed of four partial images 4a, 4b, 4c, 4d by using four projectors 2a, 2b, 2c, 2d.

The optical blend masks 7a, 7b, 7c, 7d have areas along two adjacent edges which have dark fields and extend in the shape an "L". By using these dark fields, the brightness of the projected partial images 4a, 4b, 4c, 4d on the projection surface 3 is reduced in the blend zones 9, producing a uniform brightness when the partial images 4a, 4b, 4c, 4d are superimposed. This process of blending is achieved by varying the opacity in the L-shaped fields. The masks 7a, 7b, 7c, 7d remain translucent outside the opaque areas that are not located within the blend zone 9.

Figure 6:
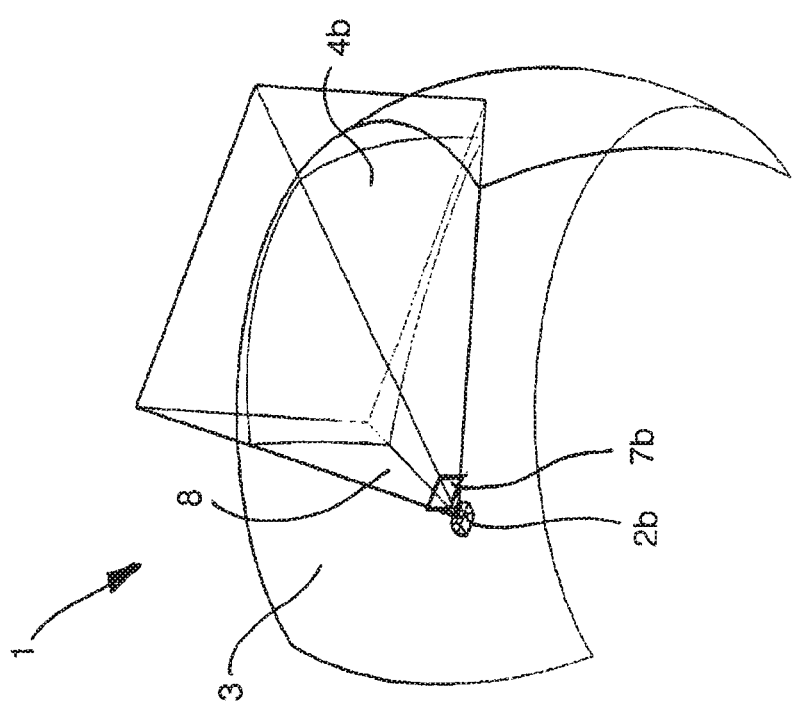

FIG. 6 shows part of a projection system 1. The example shows the projector 2b of a projection system 1 having four projectors 2a, 2b, 2c, 2d. This projector 2b projects the partial image 4b, which represents the upper right-hand portion of the large-area projection 5, onto the curved projection surface 3. In the illustration of FIG. 6, an optical blend mask 7b is arranged in the beam path 8 of the projector 2b in a so-called blend mask plane. For affixing the optical blend mask 7b, for example, a frame may be provided, in which the optical blend mask 7b can be arranged. This frame is preferably fixedly connected to the projector 2b via a holder. The frame and the holder are not shown in FIG. 6.

Figure 7:
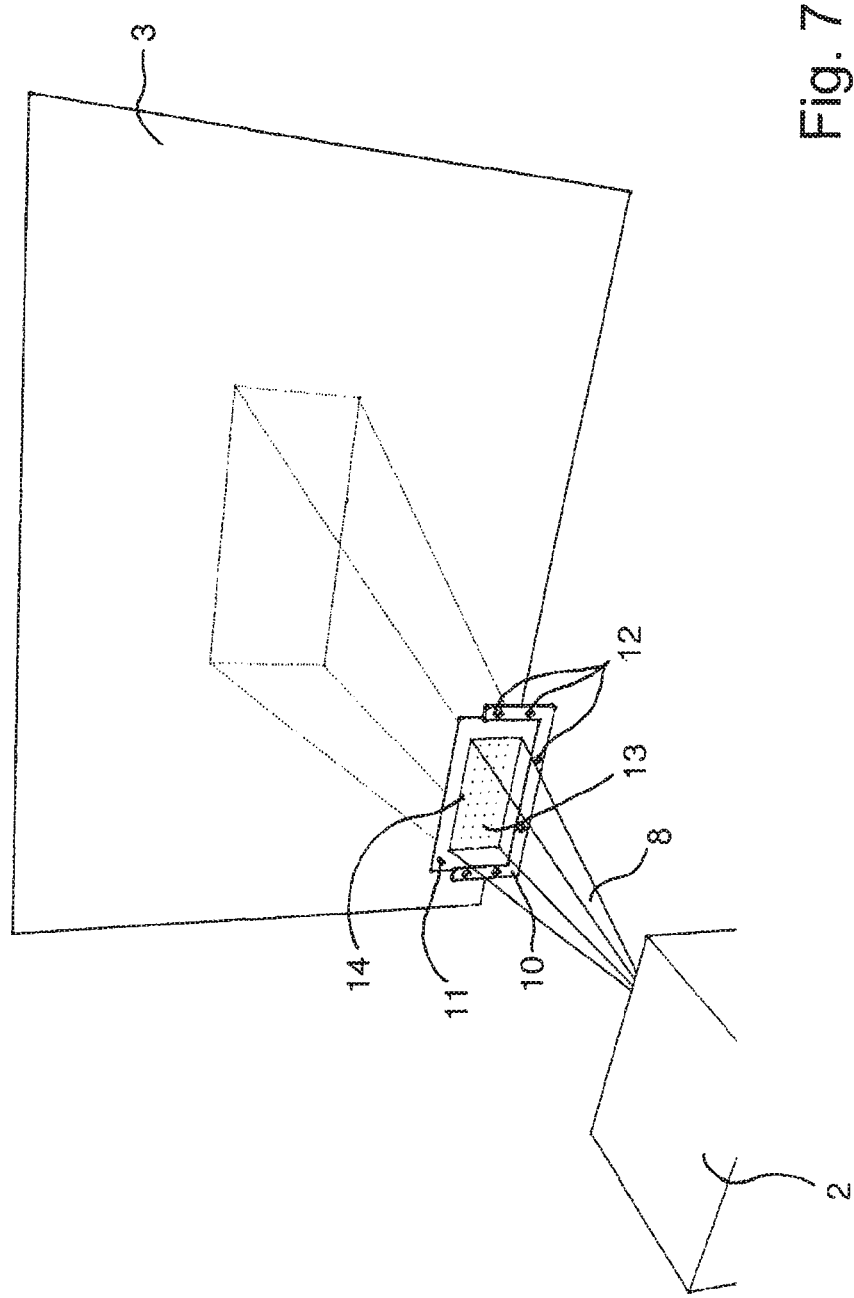

FIG. 7 shows positioning of a front or rear projection surface 11 in a frame 10 in the beam path 8 of a projector 2 in front of a projection surface 3. The illustration shows a, for example, U-shaped frame 10 arranged in front of the projector 2, which is suitable both for receiving a front or rear projection surface 11 and for receiving an optical blend mask 7 produced according to the process flow.

The frame 10, which is not limited to the illustrated shape, may for example have a groove into which the front or rear projection surface 11 as well as the mask 7 can be inserted. The frame 10 is firmly connected to the projector 2 by way of an unillustrated holder or to another fixed point and is fixed in its position in this way. Marks 12 which define a local reference coordinate system are arranged on the frame 10. The position of the front or rear projection surface 11 and of the optical blend mask 7 is defined in this local reference coordinate system.

FIG. 7 shows the frame 10 with a front or rear projection surface 11 onto which patterns 13 are projected. Preferably, these patterns 13 can be points whose relative position with respect to a local reference coordinate system is determined by using a camera recording the points and by an unillustrated computing and control unit.

An imaged projection surface 14, which is generated when the projector 2 projects a partial image 4 onto the projection surface 3, is shown on the front or rear projection surface 11 arranged in the beam path 8 of the projector 2. The position and orientation of this imaged projection surface 14 located in the blend mask plane is detected in the blend mask plane in accordance with the method and serves to precisely align the optical blend mask (7) within the image mask plane when the data for the optical blend mask (7) are generated.

LIST OF REFERENCE NUMBERS

1 projection system
2*a*, 2*b*, 2*c*, 2*d* projector
3 projection surface
4*a*, 4*b*, 4*c*, 4*d* partial images
5 large-area projection
6 flat projection surface
7*a*, 7*b*, 7*c*, 7*d* optical blend mask
8 beam path
9 blend zone
10 frame
11 front or rear projection surface
12 mark
13 pattern
14 imaged projection surface
15 image generation
16 distortion
17 blending
18 projection
19 image generation unit (Personal Computer PC)
20 distortion unit (warp unit)
21 graphics card
22 blend unit

The invention claimed is:

1. A method for automatically generating an optical blend mask (7), arranged in a beam path (8) of a projector (2) in a projection system (1) comprising at least two projectors (2), comprising the steps of:
   determining an actual state of the projection system (1) by a calibration,
   determining an individual distortion of the projector (2) by using a front or rear projection surface (11) inserted in the beam path (8) between the projector (2) and a projection surface (3) using patterns (13) from which projected points are derived;
   determining orientation and position of the front or rear projection surface (11) within a blend mask plane with respect to a local reference coordinate system,
   calculating ideal blending for a partial image (4) to be projected by the projector (2) in such a way that the ideal blending is positioned and/or transformed on the blend mask plane,
   adapting the ideal blending to compensate for a soft focus in the beam path (8),
   applying the determined, individual distortion of the projector (2) to the ideal blending, and
   determining data for generating an optical blend mask (7),
   wherein the optical blend mask (7) generated according to the determined data is used at a location in the beam path (8) of the projector (2) at which the front or rear projection surface (11) was positioned when determining the individual distortion of the projector (2).

2. The method according to claim 1, wherein the determining the individual distortion of the projector (2) includes the following method steps:
   projecting the patterns (13), from which the projected points are derived,
   recording the projected points derived from the pattern (13) by using a camera, with position and alignment and/or orientation of the camera in the local reference coordinate system being known,
   determining the projected points derived in the local reference coordinate system,
   recording of the determined projected points derived in the local reference coordinate system,
   calculating the distortion of the projector (2) based on the recorded projected points derived.

3. The method according to claim 1, wherein the calculation of the ideal blending also comprises the method steps of iteratively optimizing the data of the generated optical blend mask (7), wherein ideal imaging of the blending on the projection surface (3) is simulated and compared with an expected blending using the data of a previously generated optical blend mask (7) so as to reduce discrepancies between the ideal image of the blending and the expected blending.

4. The method according to claim 1, wherein the data for generating the optical blend mask (7) includes information about a number of pixels arranged horizontally and vertically in the optical blend mask (7) and their intensity on the optical blend mask (7), with which a brightness reduction is performed.

5. The method according to claim 1, wherein the data for generating the optical blend mask (7) is determined for two or more optical blend masks (7).

6. The method according to claim 1, wherein the data of the generated optical blend mask (7) is used to control a printing method for producing a printed optical blend mask (7).

7. The method according to claim 1, further comprising the steps of:
   transmitting an image to be displayed via the projector (2); and
   controlling the transmitted image to be displayed via the generated optical blend mask (7).

8. The method according to claim 1, wherein the projection system (1) includes a frame positioned in the beam path; the generated optical blend mask (7) or the front or rear projection surface (11) each being receivable in the frame; markings on the frame forming the local reference coordinate system.

\* \* \* \* \*